United States Patent Office 3,026,316
Patented Mar. 20, 1962

3,026,316
NEW ANALOGUES OF VITAMIN $B_{12}$ AND PROCESS FOR THEIR BIOSYNTHESIS
Aurelio di Marco, Giulia Boretti, Riccardo Barchielli, Celestino Spalla, Domenico Cattapan, and Cesare Bertazzoli, all of Milan, Italy, assignors to Societá Farmaceutici Italia, Milan, Italy, a corporation of Italy
No Drawing. Filed July 22, 1959, Ser. No. 828,704
Claims priority, application Great Britain July 25, 1958
9 Claims. (Cl. 260—211.5)

This invention relates to a number of new cobalamines, that is analogues of vitamin $B_{12}$, having vitamin $B_{12}$ activity. It also relates to a process for their biosynthesis, and to methods for extracting and separating to analogues from the fermented substrate, and from each other when required.

In U.S. application Serial No. 580,460 filed on April 25, 1956, issued as Patent 2,886,490, May 12, 1959, we have described and claimed a process for producing cobalamines by fermentation with a micro-organism of the species Nocardia rugosa, a new species of Nocardia isolated from the digestive tract of oxen. A culture of the organism of Nocardia rugosa has been deposited in the Waksman Collection, at Rutgers University, New Brunswick, New Jersey, under the Index Number 3,760 (December 1957).

The strains used for the production of cobalamine analogues are mutants of the species Nocardia rugosa described by Di Marco and Spalla (Giorn. Microbiol. 4, 24, 1957). The mutant strains were obtained by irradiation of the parent strain with ultra-violet light. They are characterized by their ability to accumulate factor B and other vitamin $B_{12}$-like substances belonging to the group of the "incomplete factors" (Kon S. and Pawelkiewicz J.: Biosynthesis of Vitamin $B_{12}$ Analogues, Symposium XI, Congress of Biochemistry, Vienna 1958). The presence of these factors in the cultures of the mutant strains can be proved by the difference between their growth-promoting activities on E. coli 113/3, which responds to all factors, and on L. leichmannii 7830, which responds to vitamin $B_{12}$ only, as well as by paper chromatography or electrophoresis and bioauthography with E. coli 113/3.

This invention relates to novel cobalamines (analogues of vitamin $B_{12}$) and to their production by the modification of the fermentation of nutritional substrates with micro-organisms of the species Nocardia rugosa by the addition of certain compounds. The invention further relates to their isolation from the substrates by electrophoresis methods and countercurrent extraction and to the use of the new analogues in place of vitamin $B_{12}$.

The invention further relates to a process for the production of cobalamines, which comprises fermenting with a micro-organism of the species Nocardia rugosa, a nutritional substrate containing 2,3-diamino-5,6,7,8-tetrahydronaphthalene or 5,6-tetrahydrobenzene-benzimidazole or 2,4,5-triaminotoluene or 5(6)-amino-6(5)-methylbenzimidazole. A cobalamine of the invention is one having a vitamin $B_{12}$-like activity, producible by fermenting with a micro-organism of the species Nocardia rugosa, a nutritional substrate containing 2,3-diamino-5,6,7,8-tetrahydronaphthalene or 5,6-tetrahydrobenzene-benzimidazole or 2,4,5-triaminotoluene or 5(6)-amino-6(5)-methylbenzimidazole having an $Rf$ as hereinbefore defined and being separable from vitamin $B_{12}$ by either chromatographic or electrophoretic separation.

The fermentation processes employed are those generally known but preferably the aerated submerged culture method is used, as described in U.S. application Serial No. 656,210, filed on May 1, 1957, now abandoned, save that, depending on the analogue to be prepared, 2,3-diamino - 5,6,7,8 - tetrahydronaphthalene or 5,6 - tetrahydrobenzenebenzimidazole or 2,4,5 - triaminotoluene or 5(6)-amino-6(5)methylbenzimidazole is added to the substrate.

The methods of extraction employed are also similar to those described in said specification, although depending on the biosynthesized analogue the preferred method of separating it from vitamin $B_{12}$ and any other substances of the cobalamine group present in the crude extraction product may be different.

Since the various methods involved are to a large extent based on the characteristics of the new Analogues A, B and C which are provided by the invention, these characteristics will first be described.

ANALOGUE A

Cultures of Nocardia rugosa, upon addition of 2,3-diaminotetrahydronaphthalene produce a cobalamine (Analogue A) which differs from vitamin $B_{12}$ due to the following characteristics:

(1) Chromatographic $Rf$ in secondary butyl alcohol-acetic acid-water, according to the technique of Ford et al. (J. Ford, E. S. Holdsworth, S. Kon; Biochem. J. 59, 86, 1955), is clearly higher than that of vitamin $B_{12}$ $$(Rf/RfB_{12}=1.2)$$

(2) Coefficient of distribution, between 24% aqueous ammonium sulphate solution and 1-butanol, higher than 1 (distribution coefficient of $B_{12}=1$).

(3) Benzimidazole, freed by acid hydrolysis of the analogue, behaves in paper chromatography, like 5,6-tetrahydrobenzenebenzimidazole ($Rf=0.78$, $Rf$ of 5,6-dimethylbenzimidazole obtainable from vitamin $B_{12}$ is 0.74). The absorption spectrum of the same hydrolysis product, eluted after chromatography on paper, presents the absorption peaks at 281 and 289 m$\mu$, which are characteristic of 5,6-tetrahydrobenzene benzimidazole while 5,6-dimethylbenzimidazole obtainable from vitamin $B_{12}$ presents absorption peaks at 275.5 and 283 m$\mu$.

The process of separating vitamin $B_{12}$ also contained in the extraction crude products is based on characteristic (2) which relates to the different coefficient of distribution of the two substances in the 2-phase system consisting of n-butanol and a 24% aqueous ammonium sulphate solution.

The operation is carried out in automatic apparatus similar to that described by Craig (L. C. Craig, Anal. Chem. 22, 1346 (1950); L. C. Craig, W. Hausmann, E. H. Ahrens, E. Harfenist, ibid. 23, 1236, (1951)) having 200 tubes, and employing the method of recirculating the upper phase. The separation is complete when the two colored bands, corresponding to the new Analogue A and to vitamin $B_{12}$, respectively, appear to be clearly resolved.

The content of the tubes is controlled by chromatography and the fractions containing only the analogue are combined. To the alcohol phase such a solvent is added which reduces the solubility of the cobalamine and this can therefore be extracted with water and combined with the aqueous phase. From the aqueous salt solution the analogue is extracted with solvents suitable for the extraction of cobalamines (i.e. vitamin $B_{12}$-like substances) in general, e.g. phenol or naphthols, their homologues or halogen derivatives, alone or in admixture with other solvents such as chloroform or carbon tetrachloride. It is then precipitated with acetone or other suitable solvents on Supercel, from which it is eluted with alcohols having a low number of carbon atoms. The alcohol solution is mixed with water, the alcohol is evaporated and the analogue is precipitated from the aqueous solution by adding 3–4 volumes of acetone.

The analogue thus obtained is characterized by its biological activity as growth factor for micro-organisms requiring vitamin $B_{12}$.

The Analogue A, like vitamin $B_{12}$, stimulates the growth of higher animals kept on a vitamin $B_{12}$-deficient diet.

ANALOGUES B AND C

Cultures of *Nocardia rugosa*, by addition of 2,4,5-triaminotoluene, form, together with vitamin $B_{12}$, two other cobalamines (Analogues B and C) which differ from vitamin $B_{12}$ due to the following characteristics:

(a) On acid hydrolysis both Analogues B and C release a substance which, by its chromatographic behavior, fluorescence and absorption spectrum under different pH, can be shown to be 5(6)-methyl-6(5)-aminobenzimidazole. An unidentified substance, having higher chromatographic Rf, yellow fluorescence and an absorption peak at 260 m$\mu$ is also formed, which is also found in solutions of 5(6)-methyl-6(5)-aminobenzimidazole which have undergone similar treatment with acid.

(b) *Electrophoretic behavior.*—The two Analogues B and C clearly differ from vitamin $B_{12}$ due to their electropositive behavior in 0.5 N acetic acid solutions, and from each other due to their different mobility towards the cathode.

(c) *Chromatographic behavior.*—When subjected to chromatography on paper in secondary butyl alcohol-acetic acid-water according to J. E. Ford et al., both Analogues B and C can be differentiated from vitamin $B_{12}$ due to a lower migration rate (Rf/Rf $B_{12}$=0.45).

(d) *Absorption spectrum.*—The absorption spectrum of both Analogues B and C differs from that of vitamin $B_{12}$ in the zone between 260 and 330 m$\mu$. In this zone, in fact, 2 absorption bands are noted at 278 and 300–305 m$\mu$, the relative intensity of which varies with the pH while the band at 300–305 m$\mu$, becomes more clear at pH>3.6. The absorption spectrum also makes it possible to distinguish the two analogues from each other; for instance, at pH 3.6 the more electropositive analogue presents a very distinct peak at 278 m$\mu$ and a "shoulder" at from 295 to 305 m$\mu$ while the less electropositive analogue shows two peaks at 278 and 300 m$\mu$, having the same intensity. Such behavior of their spectra is a further confirmation of the presence, in the analogues, of 5(6)-methyl-6(5)-aminobenzimidazole whose ultra-violet spectrum presents two peaks at 270 and 278 m$\mu$ at acid pH and a single peak at 295 m$\mu$ at alkaline pH.

(e) *Biological activity.*—The two new Analogues B and C present an activity as growth factors for all micro-organisms requiring vitamin $B_{12}$, as determined according to the technique of B. D. Davis, E. Mingioli (J. Bacteriol. 60, 17, 1950) for *E. coli* 113/3, the technique described in U.S.P. IV Third Suppl. Revision: 15 1951 for *Lactobacillus leichmannii* 7830 of S. H. Hutner, L. Provasoli and G. Filfus (Am. N. J. Acad. Sci. 56 (5) 852, 1953) for *Ochromonas malhamensis*, of S. Hutner et al. (cited in Glick: Methods of Biochemical Analysis, vol. II, 81, 1957) for *Euglena gracilis* var. *bacillaris*.

The two Analogues B and C, like vitamin $B_{12}$, stimulate to the same degree the growth of higher animals (rat, chicken) kept on a vitamin $B_{12}$-deficient diet. Such an effect is obtained after 4–5 weeks of treatment with 5–40 y./kg. of body weight administered subcutaneously twice a week and with 20–80 y./kg. of diet given orally. Considerable amounts of the two substances are found in the serum, liver and kidney even after interruption of the treatment. In addition, the Analogues B and C have shown effectiveness in the treatment of a number of patients suffering with pernicious anemia and megaloblast or perniciosiform anemia (from gastrectomy) and bring about a considerable rise in reticulocyte counts, an increase both in the hemoglobin value and in the amount of erythrocytes, a decrease in the globular value with dosages similar to those used with vitamin $B_{12}$.

The separation of the two analogues from vitamin $B_{12}$ contained in the crude products and from each other is carried out on the basis of their electropositive character, using the technique described by H. Dellweg, E. Becker; K. Bernhauer (Biochem. 2, 328, 1956, 88). From the 0.5 N acetic acid solutions obtained after electrophoresis both Analogues B and C are recovered by methods similar to those employed for Analogue A after the countercurrent extraction. It is in general necessary to repeat the electrophoresis process on the fraction containing the less electropositive compound in order to have it perfectly isolated from the other one.

The following examples are given to illustrate the invention, wherein the above specified mutants are employed.

*Example 1.—Nutritional Substrate: Malt Extract 4%, Glucose 4%, N-Z-Amine 1.5%, Corn Steep 0.5%, $CaCO_3$ 0.5%, $(NH_4)_2SO_4$ 0.5%, NaCl 0.1%, $CoCl_2$ 10 p.p.m.*

After sterilization and cooling to 33° C., 50 litres substrate are inoculated with 100 cc. of a suspension obtained by washing a culture on a Roux of nutritive agar. The bulk is fermented for a time of from 25 to 40 hours at 33° C. while aerating by blowing air at the rate of 30 to 50 litres per minute and stirring at from 150 to 300 r.p.m. When the turbidity of the culture corresponds to a dry weight of 3 to 5 mg./cc., the resulting culture is used to inoculate a large volume of substrate in a fermenting tank.

The substrate used in this stage has the composition given above plus 100 to 400 gamma/cc. of 2,3-diamino-tetrahydronaphthalene which is added after having been sterilized in aqueous suspension or by contact with 95% alcohol for two hours.

When the fermentation is completed, 45 litres broth are obtained which, after addition of 0.5% NaCN, are heated in an autoclave at 120° C. for 30 minutes. Mycellium is then separated by centrifuging and washing with water, the washing water being added to the clear liquid which thus attains a volume of 48 litres. This liquid is saturated with 620 cc. cresol and extracted first with 3% and then with 2% cresol mixed with carbon tetrachloride in a ratio of 40:60 by volume. 34% pyridine is added to the extract and the mixture is stirred twice with the same volume of water. The aqueous solution containing vitamin $B_{12}$ and the cobalamine analogue is passed over Amberlite IRA 401 in acetate cycle. Vitamin $B_{12}$ and the cobalamine analogue remain in the effluent and, after addition of the water used for washing the resin, are extracted from the effluent liquid by treatment with cresol-chloroform as described above.

By adding acetone and ether to the extract, a flocky precipitate is obtained which, after addition of Supercel, is collected on a filter, then dissolved in 150 cc. water; the solution contains 200 mg. of vitamin $B_{12}$ and the cobalamine analogues. These are adsorbed on 200 cc. cyanurated Amberlite IRA 401 and eluted from this resin by means of a 5% acetic acid aqueous solution.

During this stage no loss of activity occurs. After extraction with cresol and carbon tetrachloride, reprecipitation and filtration with celite as described above, the precipitate is dissolved in methanol, the solution is concentrated to 20 cc., kept at 5° C. for 48 hours, filtered and treated with 25 cc. water.

The solution is then concentrated to 20 cc., and 70 cc. acetone are added. 120 mg. of crystals containing vitamin $B_{12}$ and the new Analogue A are separated from the solution and added to a further 101 mg. obtained in a similar way. They are then subjected to a countercurrent separation in a Craig's apparatus with the two phases consisting of n-butanol and 24 aqueous $(NH_4)_2SO_4$ solution, by placing in each tube 25 cc. of each phase.

The substance is dissolved in the first 5 tubes, by effecting 334 passages the fraction containing only the desired analogue is obtained in tubes 81 to 115, whereas tubes 51 to 80 contain a mixture of vitamin $B_{12}$ and of the new analogue.

The contents of tubes 81 to 115 are combined; the cobalamine analogue is extracted from the alcohol phase by adding 1 volume carbon tetrachloride and shaking with water. The aqueous extract is added to the aqueous phase and the mixture is concentrated to 1190 cc. containing 116 mg. cobalamine.

Extraction with an organic solvent, precipitation and re-crystallization of Analogue A are carried out by methods similar to those described above. 80 mg. needle-like red crystals, containing 80% cobalamine, are obtained.

*Example 2.—Nutritional Substrate: Glucose 4%, lactose 2%, Peptone 1%, Yeast Extract 0.25%, $KH_2PO_4$ 0.2%, $NaHPO_4$ 0.5%; NaCl 1%, $CoCl_2$ 10 p.p.m.*

The fermentation process is similar to that described in Example 1 with the exception that 2,4,5-triaminotoluene hydrochloride (100 gamma/cc.) are added in place of 2,3-diaminotetrahydronaphthalene.

When the fermentation of the broth is completed the total cobalamines (i.e. vitamin $B_{12}$ and the Analogues B and C) are extracted by a method similar to that described in Example 1.

129.4 mg. of crystals containing 82.7 mg. of a mixture of $B_{12}$ and the two electropositive cobalamine Analogues B and C are obtained. About 40 mg. of this mixture are dissolved each time in 4 cc. 0.5 N acetic acid and placed in a column for electrophoresis on paper according to Dellweg (cited above). The apparatus is subjected to an E.M.F. of 1000 volts for about 48 hours and thereafter the bands containing electropositive factors are found, distinct, at the end of the cellulose column. The current is stopped and the bands are eluted separately with 0.5 N acetic acid.

From the combined solutions of all the electrophoresis operations, the cobalamine Analogues B and C are extracted with cresol, then precipitated and recrystallized from water and acetone according to the methods described in Example 1. Needle-shaped crystals are obtained which are dried to constant weight at 37° C. under vacuum.

From the most electropositive fraction 26.8 mg. crystals (content 86.5%) are recovered. The less electropositive fraction is subjected again to electrophoresis in order to remove the small amounts of the more electropositive factor which are possibly still contained. Finally 39.9 mg. 83.04% crystals are obtained.

We claim:

1. A process for the production of cobalamine analogues of vitamin $B_{12}$ which comprises fermenting with a micro-organism of the species *Nocardia rugosa*, a nutritional substrate containing 2,4,5-triaminotoluene.

2. A process according to claim 1, in which the fermentation is carried out by the aerated, submerged culture method.

3. A process according to claim 2, in which the analogues are separated from vitamin $B_{12}$ by solvent extraction.

4. A process according to claim 1, in which the analogues are separated from vitamin $B_{12}$ by chromatography.

5. A process according to claim 1, the analogues being separated from vitamin $B_{12}$ by electrophoresis, the analogues being recovered in the more electropositive fraction.

6. A vitamin $B_{12}$ analogue, a cobalamine having vitamin $B_{12}$ biological activity, as growth factor, and distinguished from vitamin $B_{12}$ in the following characteristics: on acid hydrolysis 5(6)-methyl-6(5)-aminobenzimidazole is obtained; electropositive behavior upon electrophoresis in 0.5 N acetic acid solution; absorption bands at 278 and 300–305 m$\mu$, and a peak at 278 m$\mu$, and a shoulder at 295 to 305 m$\mu$.

7. A process for preparing the product defined in claim 6, comprising fermenting, with a micro-organism of the species *Nocardia rugosa*, a nutritional substrate containing 2,4,5-triamino toluene, extracting with an organic solvent for cobalamines, and separating vitamin $B_{12}$ from said analogue by electrophoresis, the analogue being separated as the most electropositive fraction.

8. A vitamin $B_{12}$ analogue, a cobalamine having vitamin $B_{12}$ biological activity, as growth factor, and distinguished from vitamin $B_{12}$ in the following characteristics: on acid hydrolysis 5(6)-methyl-6(5)-aminobenzimidazole is obtained; electropositive behavior upon electrophoresis in 0.5 N acetic acid solution; absorption bands at 278 and 300–305 m$\mu$, and two peaks at 278 and 300 m$\mu$.

9. A process for preparing the product defined in claim 8, comprising fermenting, with a micro-organism of the species *Nocardia rugosa*, a nutritional substrate containing 2,4,5-triamino toluene, extracting with an organic solvent for cobalamines, and separating vitamin $B_{12}$ from said analogue by electrophoresis, the analogue being separated as electropositive fraction of intermediate electropositive characteristic.

References Cited in the file of this patent
UNITED STATES PATENTS 2,893,988    Bernhauer et al. _____ July 7, 1959

FOREIGN PATENTS 1,017,324    Germany _____ Oct. 10, 1957

OTHER REFERENCES

Ford et al.: Biochemical Jr., 59, 1955, pages 86–92.